(12) United States Patent
Parry et al.

(10) Patent No.: US 7,711,697 B2
(45) Date of Patent: May 4, 2010

(54) SYSTEM AND METHOD FOR PRODUCING ELECTRONIC BUSINESS INFORMATION REPORTS AND RELATED PRODUCTS

(75) Inventors: James Evans Parry, Easton, PA (US); Eugene Patterson, Fair Haven, NJ (US)

(73) Assignee: Dun & Bradstreet Corporation, Short Hills, NJ (US)

( * ) Notice: Subject to any disclaimer, the term of this patent is extended or adjusted under 35 U.S.C. 154(b) by 1037 days.

(21) Appl. No.: 10/702,119

(22) Filed: Nov. 5, 2003

(65) Prior Publication Data

US 2004/0133501 A1 Jul. 8, 2004

Related U.S. Application Data

(60) Provisional application No. 60/424,833, filed on Nov. 8, 2002.

(51) Int. Cl.
  G06F 17/00 (2006.01)
  G06F 7/00 (2006.01)
(52) U.S. Cl. .................. 707/104.1; 707/100; 707/102
(58) Field of Classification Search ............. 705/37, 705/10, 1, 38, 36, 26; 707/100, 513, 501.1, 707/7, 102, 104.1; 715/501.1, 513; 709/203, 709/217
See application file for complete search history.

(56) References Cited

U.S. PATENT DOCUMENTS

| | | | | | |
|---|---|---|---|---|---|
| 4,989,141 | A | * | 1/1991 | Lyons et al. | 705/36 R |
| 6,101,479 | A | * | 8/2000 | Shaw | 705/8 |
| 6,185,560 | B1 | * | 2/2001 | Young et al. | 707/6 |
| 6,236,980 | B1 | | 5/2001 | Reese | 705/36 |
| 6,374,270 | B1 | * | 4/2002 | Maimon et al. | 715/210 |
| 7,398,234 | B1 | * | 7/2008 | Theis et al. | 705/30 |
| 7,536,346 | B2 | * | 5/2009 | Aliffi et al. | 705/38 |
| 2002/0040639 | A1 | | 4/2002 | Duddleson et al. | 92/52 |
| 2002/0049727 | A1 | * | 4/2002 | Rothkopf | 707/1 |
| 2002/0111896 | A1 | * | 8/2002 | Ben-Levy et al. | 705/37 |
| 2002/0120546 | A1 | * | 8/2002 | Zajac | 705/37 |
| 2002/0138340 | A1 | * | 9/2002 | Ikezawa et al. | 705/10 |
| 2002/0184043 | A1 | * | 12/2002 | Lavorgna et al. | 705/1 |
| 2003/0229580 | A1 | * | 12/2003 | Gass et al. | 705/38 |

OTHER PUBLICATIONS

"Sagent Teams with Fortune 500 Systems Integrator to Deliver Comprehensive E-Business Reporting and Analysis Solutions Worldwide"; Business Wire; Dialog; File 610; 00337320; Aug. 7, 2000; pp. 1-3.*

"LexisNexis Adds New Content and Features to LexisNexis (TM) at www.lexis.com"; PR Newswire; Dialog, File 20, 23208620; Jun. 6, 2002; pp. 1-2.*

(Continued)

*Primary Examiner*—Ella Colbert
(74) *Attorney, Agent, or Firm*—Ohlandt, Greeley, Ruggiero & Perle, L.L.P.

(57) ABSTRACT

A communication system for producing electronic business information reports comprising: a communication network, a website module, a product fabrication module, a computer system for communicating with and controlling the operation of the group of modules via the network, means for accessing the computer system thereby to enable communication and control of the modules by a user, and means for providing just-in-time business information reports wherein a request therefor is transmitted through the website to the product fabrication module.

9 Claims, 8 Drawing Sheets

OTHER PUBLICATIONS

Turek, Norbert; "E-Businesses Find OneSource for Information Delivery—with three products targeting sales and marketing professionals, customers get quick access (Company Business and Marketing)"; Information Week; Dialog, File 16, 08073433; Nov. 27, 2000; pp. 1-4.*

Sycara, K. and Pannu, A.S.; "The RETSINA multiagent system: towards integrating planning, execution and information gathering"; ACM, New York, NY; May 9-13, 1998; p. 1.*

"LexisNexis Adds New Content and Features to LexisNexis(TM) at www.lexis.com"; PR Newswire; Jun. 6, 2002; pp. 1-2.*

International Search Report, dated Dec. 28, 2004.

* cited by examiner

SYSTEM AND METHOD FOR PRODUCING ELECTRONIC BUSINESS INFORMATION REPORTS AND RELATED PRODUCTS

CROSS-REFERENCE

The present application claims priority to U.S. Provisional Application Ser. No. 60/424,833, filed on Nov. 8, 2002.

FIELD OF THE INVENTION

The present invention is concerned with enhancing and developing elaborate databases for ensuring a facility for multiple inquiries of various types with respect to a variety of businesses.

BACKGROUND OF THE INVENTION

It has been known for many years to build up files, and to provide databases that contain the files, relating to a variety of businesses about whom inquiries are to be made. Many companies conduct investigations aimed at establishing credit worthiness, or lack thereof, of such businesses, and also to associate this credit information with a variety of other data about those businesses.

Besides the more or less traditional investigations into credit worthiness and other related data, there has been developed a novel scheme that will aid customers to determine whether businesses that are inquired about appear to share certain proclivities with businesses already identified as having engaged in questionable, even unethical, activity. In this connection, reference may be made to co-pending application U.S. patent application Ser. No. 10/021,253, filed on Dec. 13, 2001, which is incorporated by reference in its entirety, and that produces by its system's operation a figure of merit or "higher risk" score. In accordance with that invention, the characteristics of certain businesses on file, which businesses are considered to have engaged in questionable activities, are used to train a neural network whereby a neural network module, which is capable of identifying patterns in the data elements or characteristics of those businesses, is created. Thereafter, the data elements of business under inquiry is analyzed by the neural network module such that a weighted sum of its elements or characteristics can be obtained. The so-called "higher risk score" can be developed from this weighted sum. The higher risk score indicates to the subscriber or customer that the business is under financial stress and thus they may want to be careful in extending credit because they may not be repaid.

The present invention is directed to a method of converting such previously developed or stored business data into usable data that may be retrieved by a user in a report format on-the-fly.

SUMMARY OF THE INVENTION

A processing system for providing business information reports that are not just for credit purposes. Instead, they can be used for a variety of purposes, such as pre-sales planning, competitor research, research and development, and insurance underwriting. In accordance with this aspect of the invention, the system involves the provision of a communication system for producing electronic business information reports (eBIR), the system comprising a communication network, and a computer system, suitably programmed, for communicating with and controlling the operation of a group of functional modules. Certain of these modules implement primary functions of the system, while others implement ancillary functions and can be regarded as sub-modules. The computer system enables the desired communication and control of the modules by an operator. The modules, which are symbolized by functional blocks in the further description of the invention include a database that contains records of businesses, for example a corporate identifier, such as a Data Universal Numbering System (DUNS) number; a component or module denominated eBIR that serves to produce the desired business reports; and a website module.

In accordance with another embodiment of the invention, reliance is placed upon market identifier records by which a special identifier or indicator is created. This aspect of the invention enables the production of trade data implementation from workflow documents of users by enabling the access to a computer system via, for example, a user interface. The process involves first, calculating the trade data on the system; then, transferring the trade data from the computer system to a server; subsequently, processing the trade data by transferring the trade data from the server to a trade processor. In a particular example trade data consists of payment data related to invoices of the user.

Still yet another embodiment of the present invention involves the unique on-the-fly fabrication of reports utilizing the data generated or stored in database memory systems either internal or external to the report fabrication system. In this regard, data which is retrieved from a variety of sources in XML (Extensible Markup Language) is converted utilizing a first XSLT transform engine (Extensible Stylesheet Language Transformations) producing a single, composite XML data stream by combining the multiple XML inputs from the variety of data sources. The single, composite XML stream is then transformed to Hypertext Markup Language (HTML) stream via a second XSLT transform engine. Thence, the HTML output can be readily transmitted to the HTML (Web Page) format in the form of the requested report. Thus, data can be assembled from various data sources "on the fly" in response to a request for a business report, and the process involved can involve both external and internal data sources.

The foregoing and still further objects and advantages of the present invention will be more apparent from the following detailed explanation of the preferred embodiments of the invention in connection with the accompanying drawing.

DETAILED DESCRIPTION OF THE INVENTION

Figure 1:
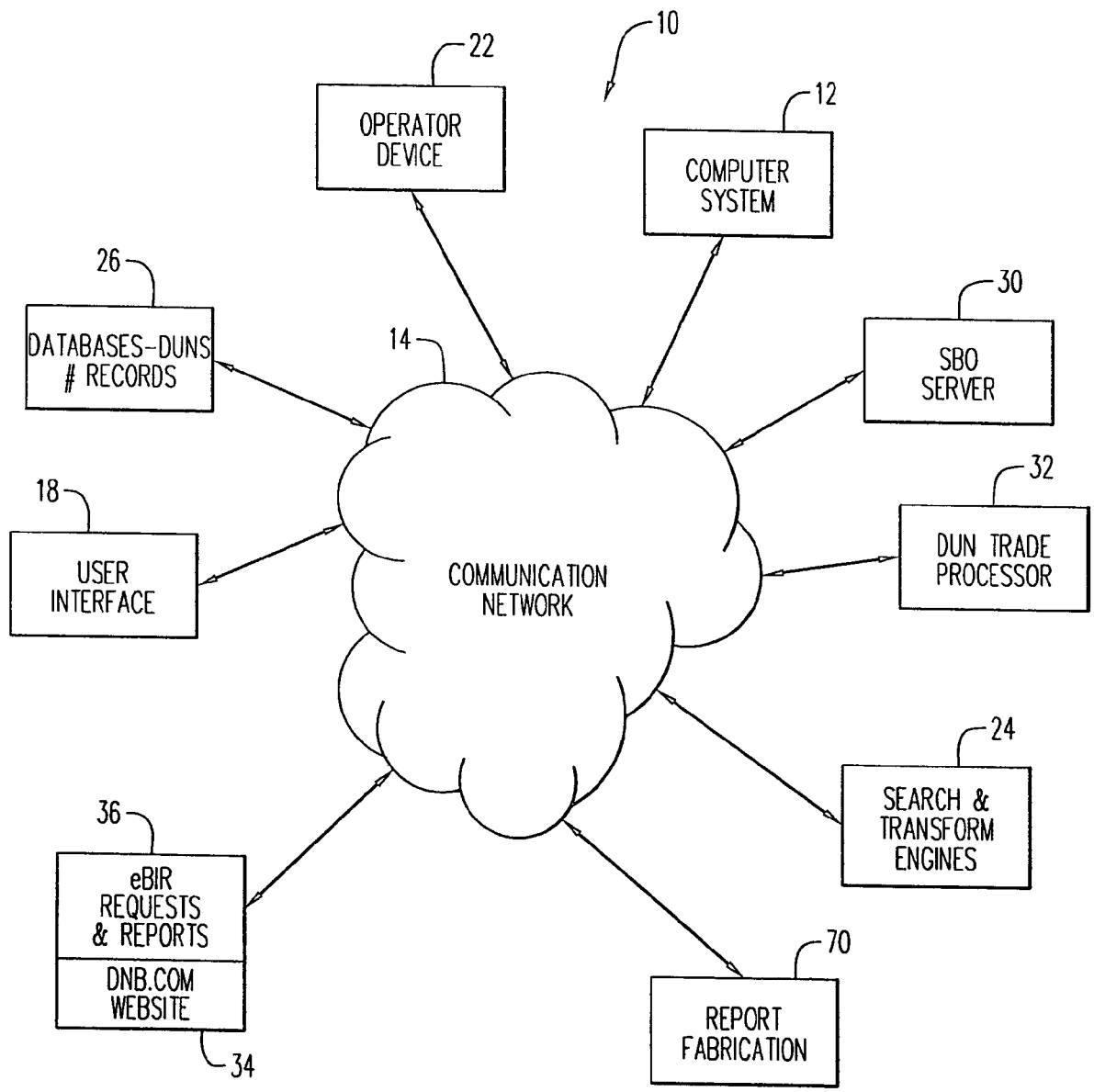
FIG. 1 is a block diagram of the system for carrying out the basic processes of one embodiment according to the present invention, including performing the steps of the processes through, or by means of, an internal, operator device, or alternately by a customer operation via a user interface, such that the desired result is achieved of eventually loading records and/or manipulating the records.

Referring, first of all, to FIG. 1, a communication system 10 is depicted for pursuing one aspect of the invention by establishing communication between a variety of components or functional modules. The system 10 basically includes a computer system 12, a communication network 14 and a user interface 18. The communication network may be any internal (office) or external, wired or wireless, network capable of conducting communications. For example, network 14 may be an internet, intranet, the Worldwide Web (hereafter referred to as the "WWW" or the "web") or the public telephone network. Network communications capability such as by modems, browsers and/or other means, not seen, may be associated with the user interface 18 so that suitable access may be gained by users of the system 10.

In addition to access through the communication network 14 by use of the user interface 18, there is also provided an operator device 22 to enable internal or office access by way of the network 14 to the other components or modules.

In one form, as seen in the FIG. 1 system, such modules are elements designed to be selectively connected to other elements in the system, and suitably directed by program means to produce a variety of desired output results.

In another form, to be described hereinafter, modules are discrete functional blocks of a system, each of which is operative to respond in sequence to the directions (instructions) of a computer program. They correspond with or are the counterparts of individual blocks typically used to symbolize individual operations or steps of the process constituting the invention.

Other modules of FIG. 1 selectively include search and transform engines 24 and database modules designated 26 in which the corporate identifier number records are stored and may be retrieved, and a server 30. A processor module 32 is also seen as well as a website 34 connected to and forming part of an eBIR module 36. In one preferred embodiment, server 30 is an SBO server, processor module 32 is a DUN Trade Processor, website 34 is a DNB.com website and eBIR module 36 is an eBIR requests and reports module. All of these modules are connected to the computer system 12 via the network 14 and to each other via such network.

The user interface 18 may be connected with any suitable customer device from which a browser may run, such as a personal computer, a telephone, a television set and the like. Alternatively, a customer device may communicate with computer system 12 via offline connections (not shown).

eBIR—Electronic Business Information Reports.

Figure 2:
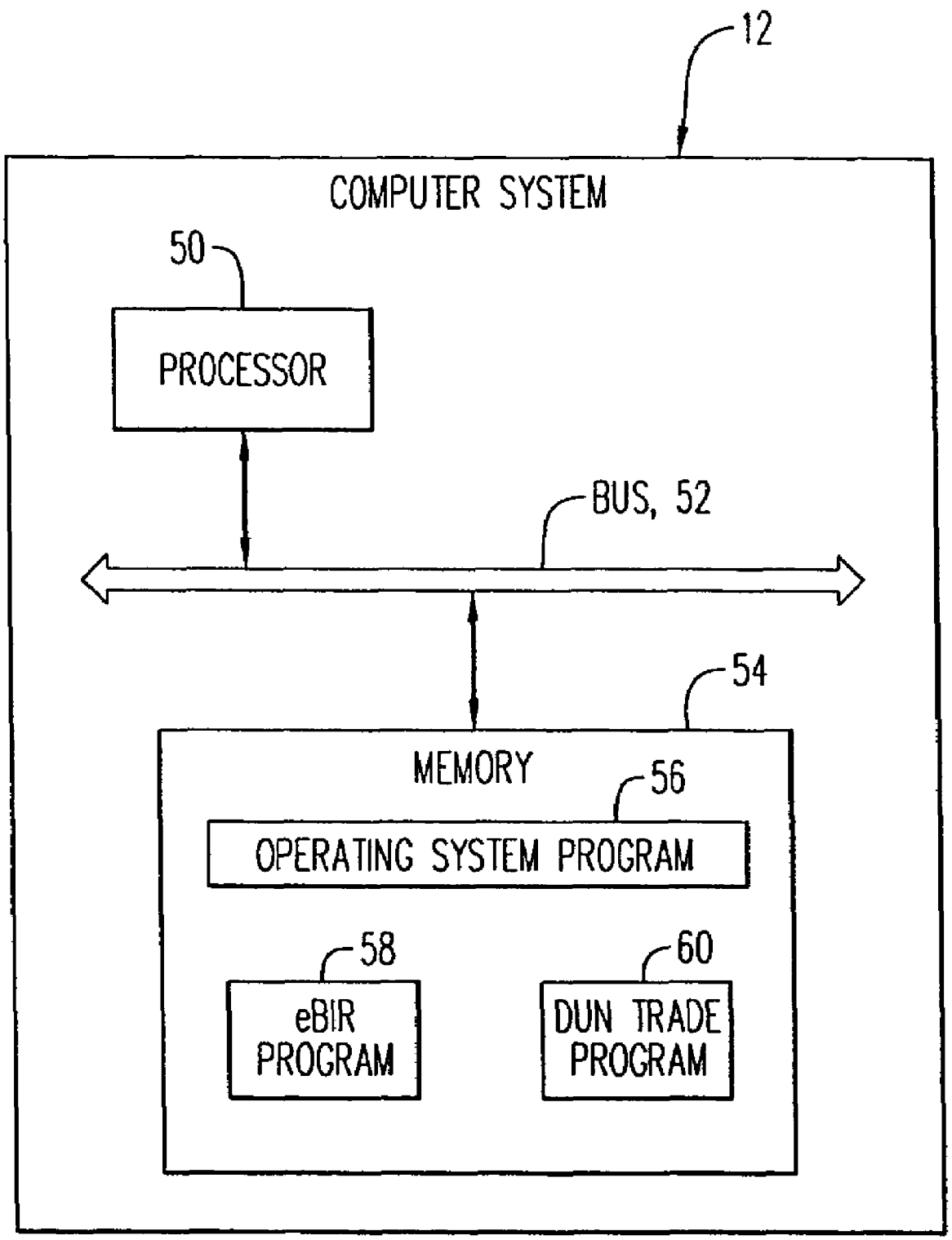
FIG. 2 is a block diagram of the computer system, situated within the overall system, for directing, by program means, the implementation of the processes in accordance with the present invention.

Referring now to FIGS. 1, 2 and 3, the present invention relates to the electronic business information record or records will be described; however, reference should first be made to FIG. 2 in connection with the arrangement whereby the computer system 12 directs through program instructions the interconnection and communication among the components or modules that play a role in producing the desired electronic business information report. Thus, from the conventional processor 50 within the computer system 12, connection is provided by line or bus 52 to a memory 54 for storing the conventional operating system program 56. Additionally, the eBIR program 58 is stored, which comes into play for selectively directing the business report application; while the stored trade program 60 directs the trade data application. In one preferred embodiment, trade program 60 is a DUN Trade Program.

The primary objective is to identify and implement a number of enhancements (that is, new content) to aid the inquiring subscriber or user to obtain the information he needs. It will be understood that the particular electronic business information reports made available by the present invention are not developed just for credit purposes, but can be varied to have a multiplicity of uses in pre-sales planning, competitive research, research and development, and insurance underwriting. A specific object or goal is to create a new electronic business information report which is retrievable on-the-fly via a communications system, such as the Internet or WWW that will provide additional content derived from both internal and external database sources.

Figure 3A:
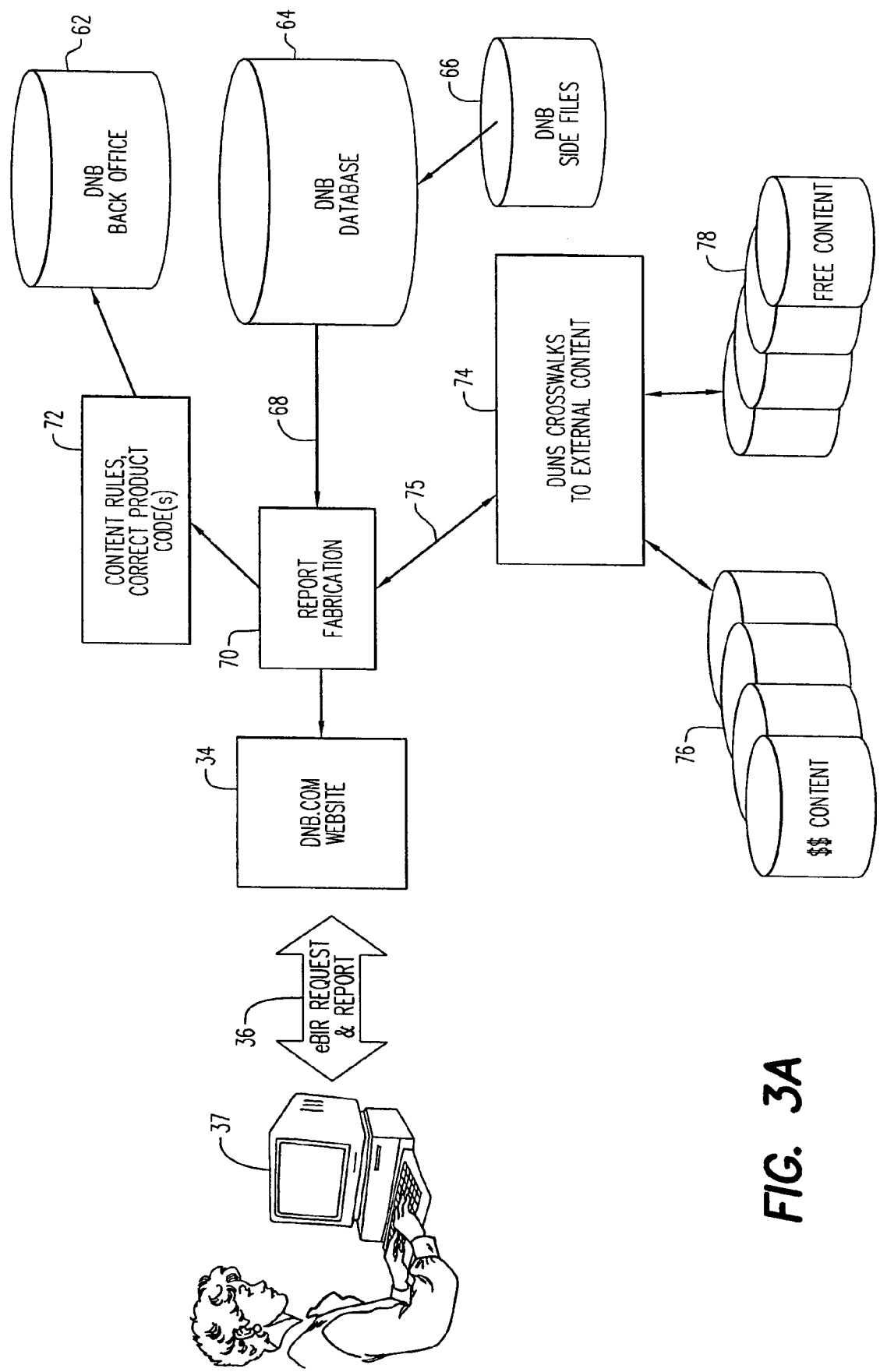
FIG. 3A is a block diagram depicting a report fabrication scheme.
Figure 3B:
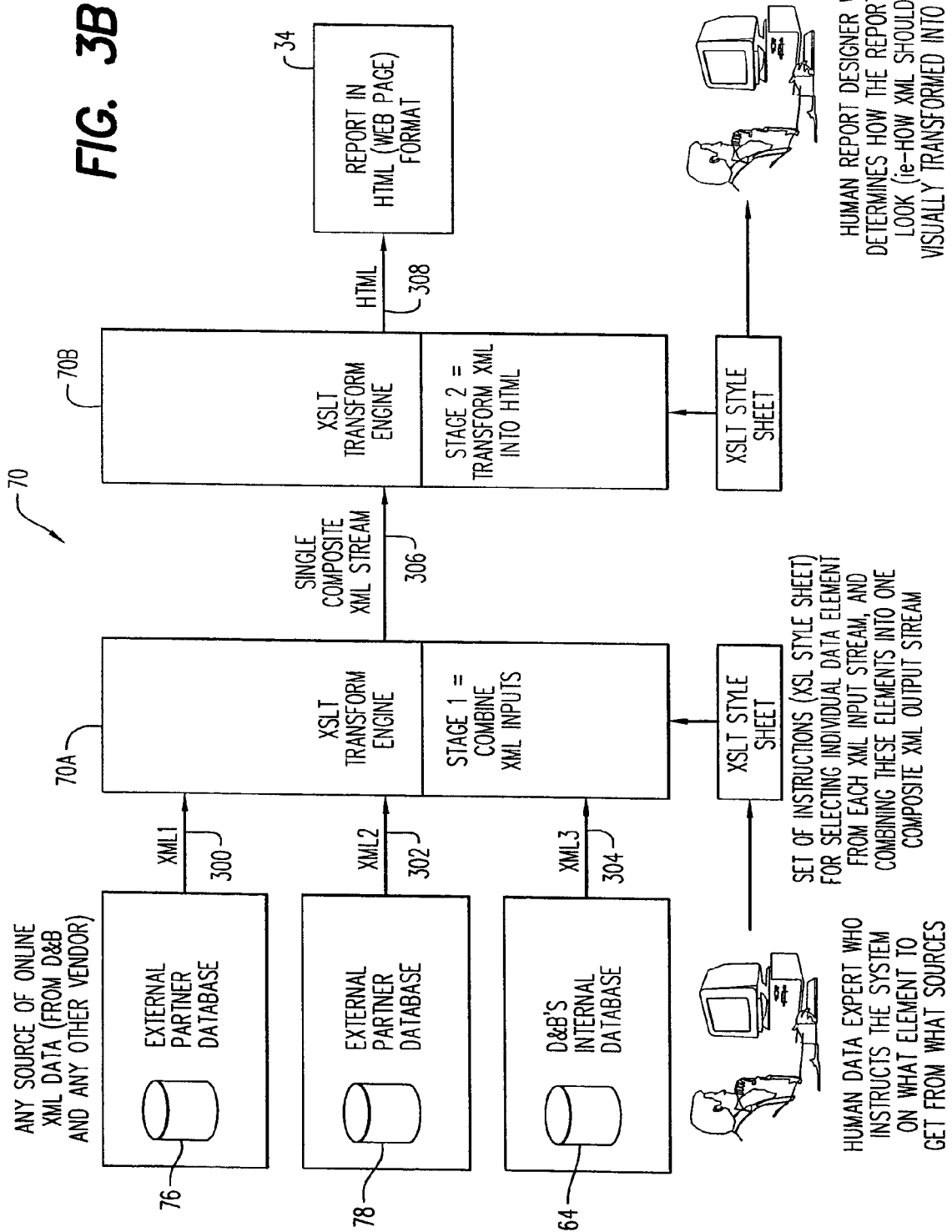
FIG. 3B is a simplified block diagram of the data flow with respect to the report fabrication module.

The structure and data flow that are provided according to a scheme of product fabrication; i.e., generating various kinds of business reports, will be appreciated by reference to FIGS. 3A and 3B. It will be understood from that, as depicted in FIG. 3A, in one instance, an operator 37 simply makes an eBIR 36 request website 34 in an Internet operation. The website 34 is coupled to local sub-modules, to and from which data flows. for example, sub-modules may included back office files 62, internal database 64, and internal side files 66. Internal database 64 is coupled by line 68 to report fabrication module 70. A special functional module, designated report fabrication module 70, is coupled by line 75 to the particular rules which govern its content, that is to module 72 that provides such content rules. Additionally coupled are sub-modules 74, 76 and 78, the former; i.e. 74, providing crosswalks function to external content, as will be explained; 76 and 78 also provide further external content; i.e., specifically they contain monetary content and free content, respectively.

With reference to FIG. 3B, a simplified schematic diagram of the report fabrication scheme is presented, including the data flow produced to achieve the business report selected. The critical fabrication module 70, previously seen in FIG. 3A, is again shown at the center of FIG. 3B in schematic form, this module having connections to the database 64 and by way of 74 to databases 76 and 78, also seen in FIG. 3A.

It will be understood that by use of the stored program means 58, developed by data and report design experts, the system seen in FIG. 3B is instructed on what element of data to get from what sources and how to prepare the data in a particular format for the report. Sources are, for example, the databases 64, 76 and 78, and from each of them online XML (Extensible Markup Language) data is transmitted. Thus, as seen on the left in FIG. 3B, input data XML1, XML2 and XML3 are sent on individual connections 300, 302 and 304 to XSLT (Extensible Stylesheet Language Transformations) transform engine 70A forming part of report fabrication module 70.

Transform engine 70A operates to combine (stage 1) all of the XML inputs and follows the XSLT style sheet based on program 58 instruction. The resulting single composite XML stream of data is fed as input on connection 306 to the stage 2 XSLT. transform engine 70B, whereby the single, composite XML data stream is transformed to an HTML stream. Thence, the output is transmitted on connection 308 to the HTML (Web Page) format in the form of the requested report. Thus, data can be assembled from various data sources "on the fly" in response to a request for a business report, and the process involved can involve both external and internal data sources.

It will now be appreciated that by the underlying concept of the present invention, as explained above, there effectively results a facility for so called "just in time" or "on-the-fly" fabrication of a business report.

Figure 4:
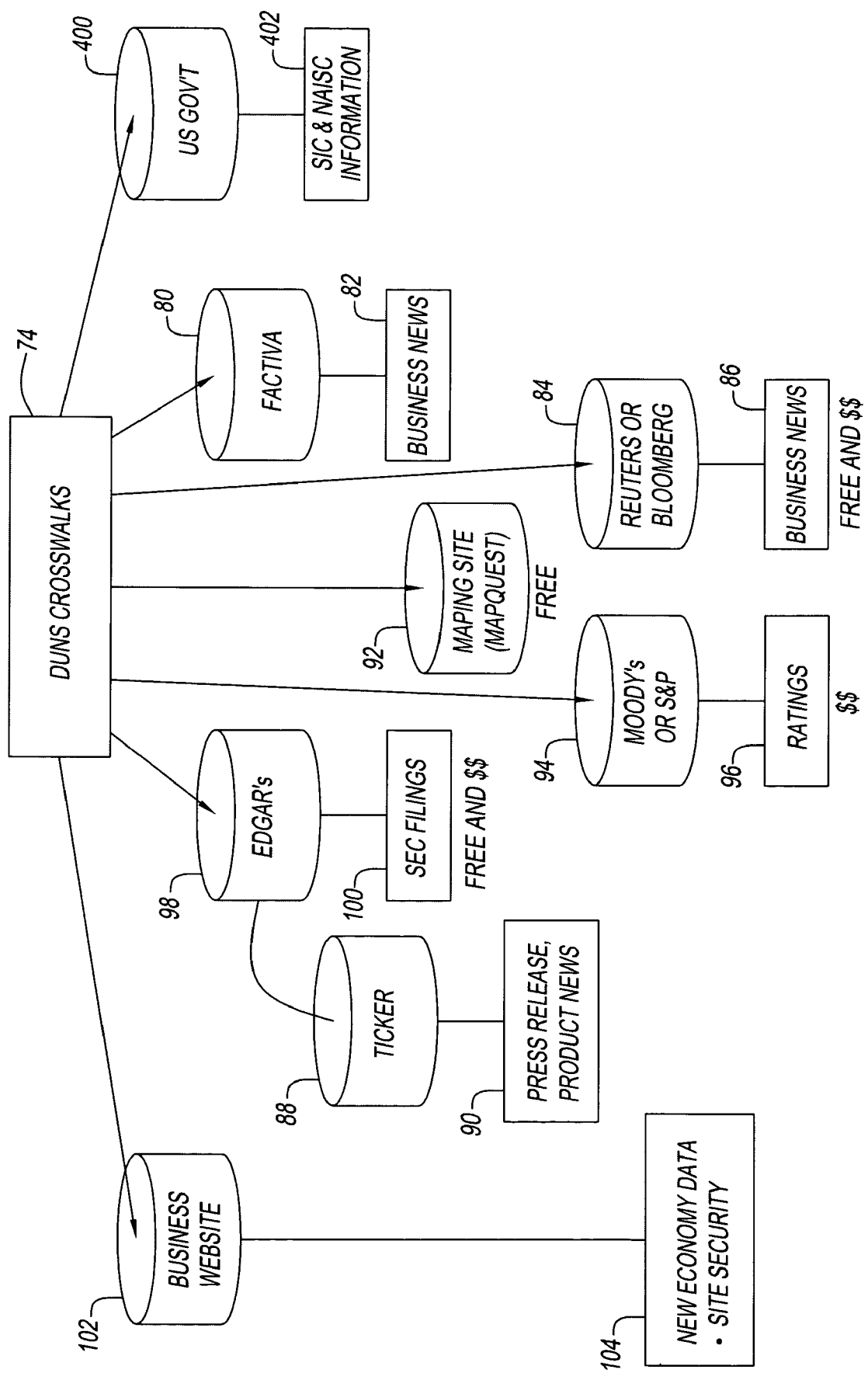
FIG. 4 is a block diagram depicting a crosswalk arrangement to external content scheme.

Turning now to FIG. 4, the specific layout and detail of the crosswalk submodule 74 is elaborated to extend content. It illustrates sub-module or file Factiva 80 coupled with business news sub-module 82. Likewise provided is a further group of sub-modules 84 (Reuters or Bloomberg files) and associated data 86; 88 (Ticker). DUNS Crosswalks 74 has access to business website 102, Edgar's 98, Moody's or S&P 94, a mapping site, such as mapquest 92, Reuters or Bloomberg 84, Factiva 80, and the U.S. Government 400. Business website 102 includes new economy data 104, including site security. Edgar's 98 includes U.S. securities & Exchange Commission (SEC) filings 100 and ticker 88, including press releases and product news 90. Moody's 94 includes ratings 96. Reuters 84 and Factiva 80 include business news 82, 86. U.S. Government 400 includes standard Industrial Classification (SIC) and North American Industry Classification System (NAISC) information 402.

Figure 5:
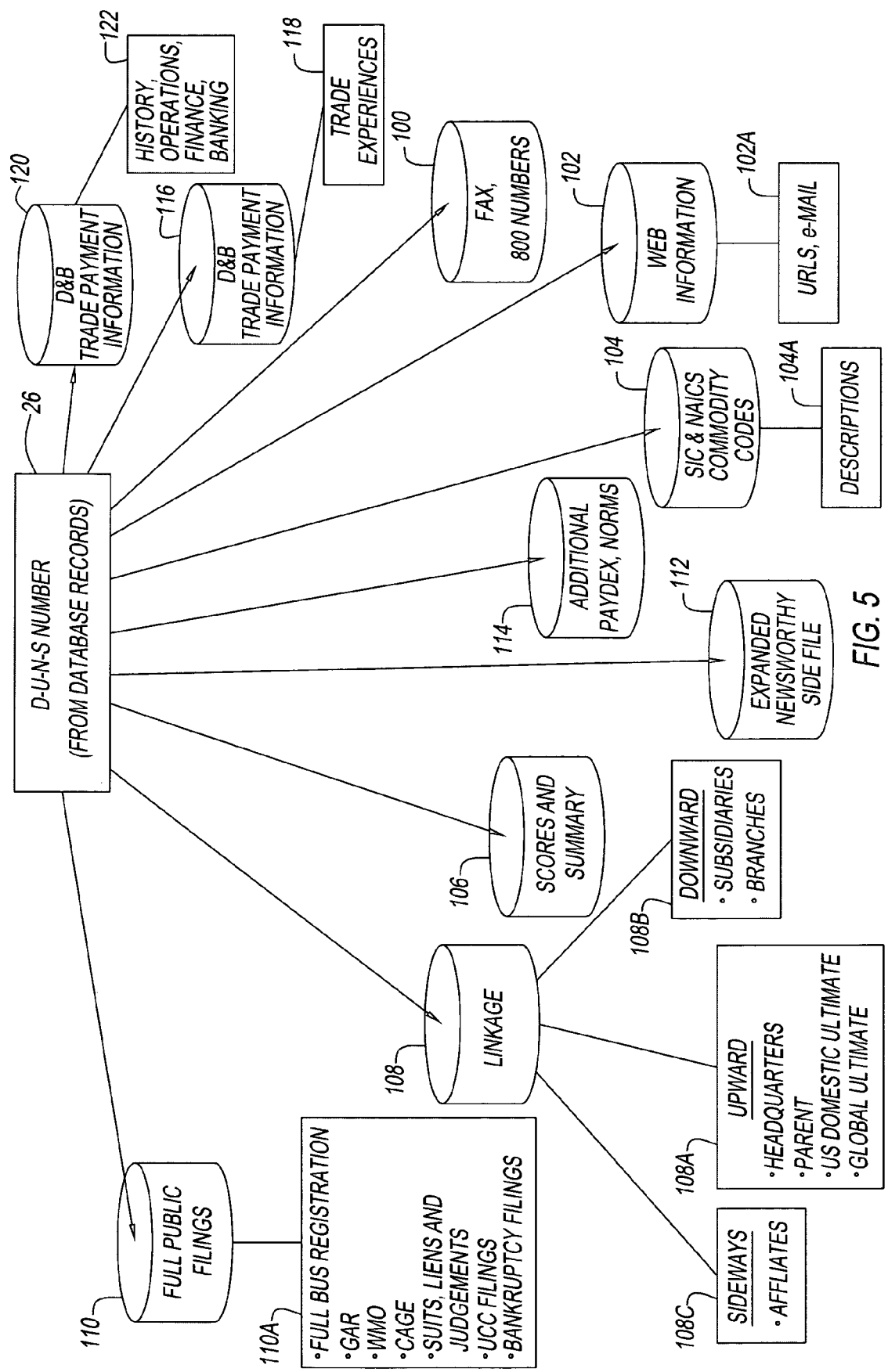
FIG. 5 is a block diagram of an additional internal content scheme.

Turning now to FIG. 5, the specific configuration and detail of the corporate identifier module 26 is elaborated including a group of sub-modules similar in configuration. Corporate identifier module 26 includes sub-modules such as full public filings 110, linkage 108, scores and summary 106, expanded newsworthy side file 112, additional paydex and norms 114, SIC & NAICS commodity codes 104, web information 102, fax and 800 numbers 100, the D&B Corporation (D&B, DNB) trade payment information 116, and D&B core report file 120. Full public filings 110 includes full business registration, Government Activity Report (GAR), WMO, Commercial and Government Entity (CAGE), suits liens and judgments, Uniform Commercial Code (UCC) filings, and bankruptcy filings. Linkage 108 includes upward 108A, downward 108B, and sideways 108C. Upwards 108A includes headquarters, parent, U.S. domestic ultimate, and global ultimate. Downwards 108B includes subsidiaries and branches. Sideways 108C includes affiliates. SIC & NAICS commodity codes includes descriptions 104A. Web information 102 includes URLs and email 102A. D&B trade payment information 116 includes trade experiences 118. D&B core report file 120 includes history, operations, finance, and banking 122.

Figure 6:
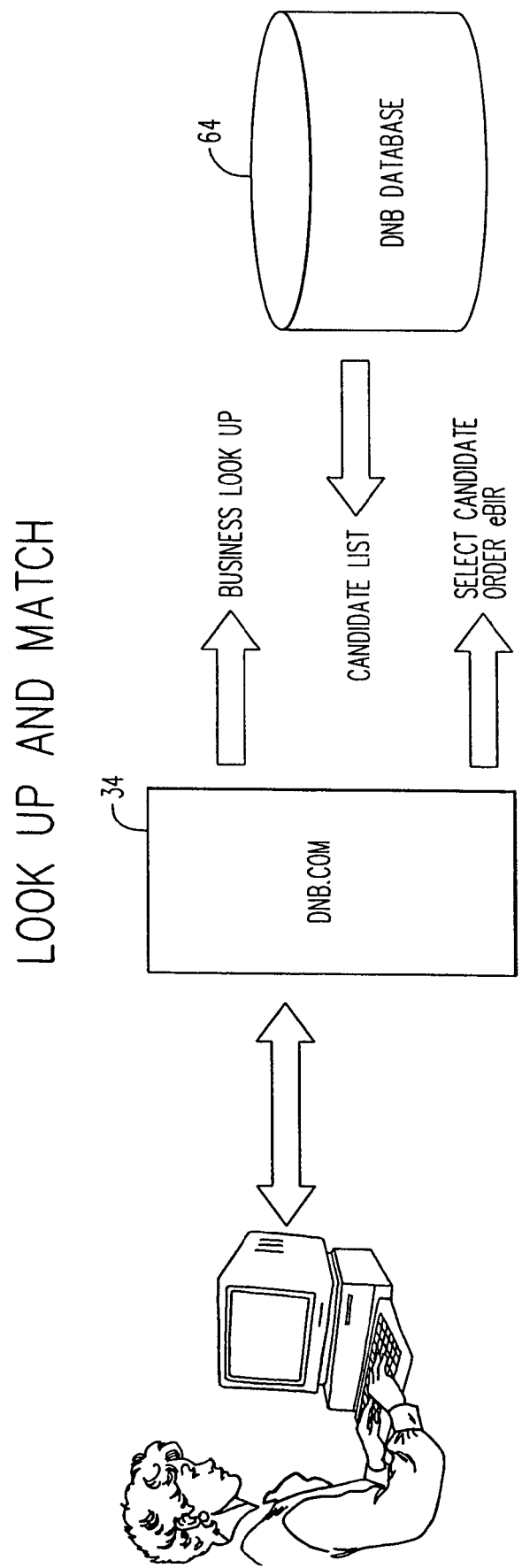
FIG. 6 is a block diagram of a lookup and match scheme.

FIG. 6 depicts another configuration and detail of a look-up and match scheme which provides data flow in connection with candidate selection in the eBIR operation.

Trade Process.

Below is a description of the trade process which constitutes a second aspect of the invention.

By means of the use of a financial accounting program, which constitutes part of the trade software 60, the user is presented with a list of their commercial credit customers and has the option to individually select the companies they want to submit payment data for and whether they want to include the "Submitted to D&B" message on the invoice.

The financial accounting program user clicks on the review data button (available on the desktop computer) to review the payment data before it is submitted to D&B.

The financial accounting program user has the opportunity to review the payment experience for each of their customers and include/exclude each of the companies for submission to D&B. All accounts must be available in this preview mode each time, so that the financial accounting program user can adjust "report to D&B" setting.

Assumption:

Days late calculation or aged trial balance summarization will be performed when review data button is clicked.

Preferred UI:

The days late field in the above screen is an editable drop-down listbox with the paying record expressed in a discrete list of values such as prompt, slow 30, slow 60 or slow 90+. The field is made editable, so the value can be changed by the financial accounting program user before it is reported to the credit company. The paying record calculation is described in the next section.

Payment Data Calculation on Financial Accounting Program Desktop

Figure 7:
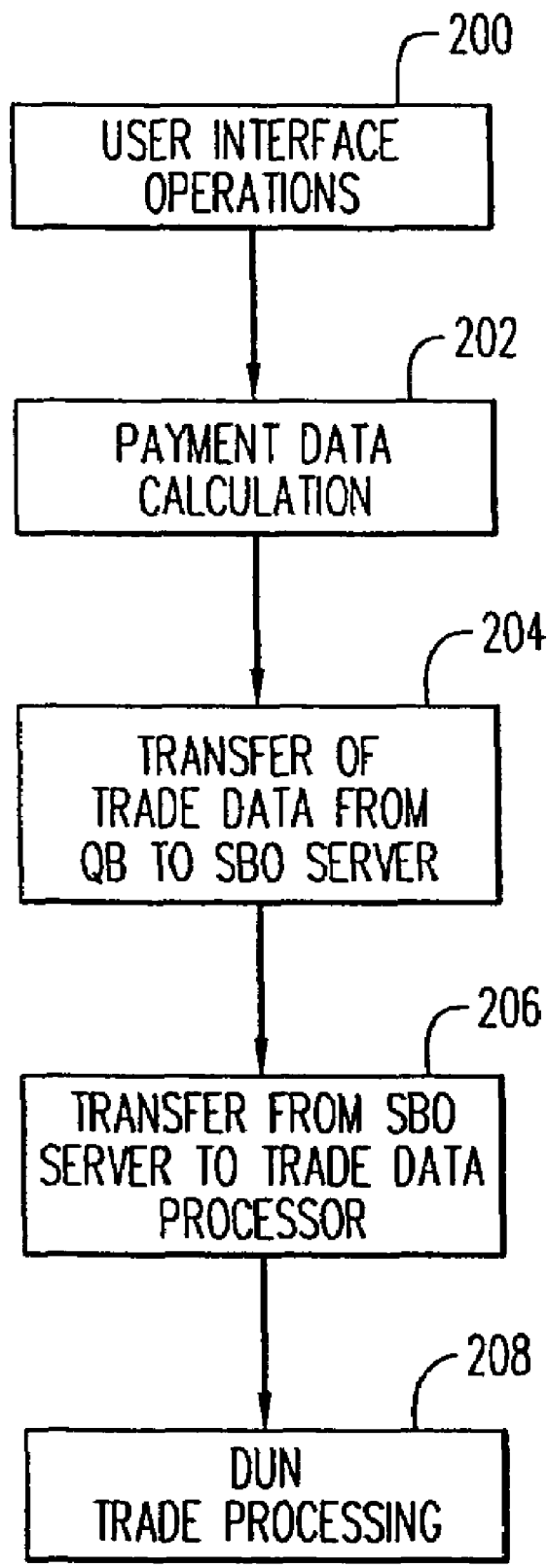
FIG. 7 is an information or data flow diagram in accordance with a process or system of the present invention.

Assumption:

FIG. 7 shows user interface operations 200. The subject calculation is depicted in FIG. 7 as the operational step 202 in the process directed by the trade program 58, which involves the financial accounting program. Here the assumptions is made that the payment data is coming from the aged trial balance report within the financial accounting program. Historical payment data is available and the paying record is a summary of the accounts behavior over the past twelve months. If there currently is no days late calculation within the financial accounting program client, the example below outlines how to take a history of aged trial balance information and summarize to determine a payment record.

TABLE 1

| | | | | | Current Aging | | | |
|---|---|---|---|---|---|---|---|---|
| Month | Sale | AmtOwe | Payment | Prompt Current | Slow30 1-30 | Slow60 31-60 | Slow90 61-90 | Slow120 91+ |
| Jan. | $10,000 | $10,000 | $ 0 | $10,000 | $ 0 | $ 0 | $0 | $0 |
| Feb. | $ 0 | $10,000 | $ 0 | $ 0 | $10,000 | $ 0 | $0 | $0 |
| Mar. | $10,000 | $10,000 | $10,000 | $10,000 | $ 0 | $ 0 | $0 | $0 |
| \\Apr. | $ 0 | $10,000 | $ 0 | $ 0 | $10,000 | $ 0 | $0 | $0 |
| May | $10,000 | $10,000 | $10,000 | $10,000 | $ 0 | $ 0 | $0 | $0 |
| Jun. | $ 0 | $10,000 | $ 0 | $ 0 | $10,000 | $ 0 | $0 | $0 |
| Jul. | $ 0 | $10,000 | $ 0 | $ 0 | $ 0 | $10,000 | $0 | $0 |
| Aug. | $ 0 | $ 0 | $10,000 | $ 0 | $ 0 | $ 0 | $0 | $0 |
| Sep. | $ 0 | $ 0 | $ 0 | $ 0 | $ 0 | $ 0 | $0 | $0 |
| Oct. | $ 0 | $ 0 | $ 0 | $ 0 | $ 0 | $ 0 | $0 | $0 |
| Nov. | $ 0 | $ 0 | $ 0 | $ 0 | $ 0 | $ 0 | $0 | $0 |
| Dec. | $ 0 | $ 0 | $ 0 | $ 0 | $ 0 | $ 0 | $0 | $0 |
| TOTAL | $30,000 | $70,000 | $30,000 | $30,000 | $30,000 | $10,000 | $0 | $0 |
| PAY $ | | | | $ 0 | $20,000 | $10,000 | | |
| PAY % | | | | 0% | 67% | 33% | 0% | 0% |

In order to calculate the paying record reported in D&B's trade section, trade calculates the total dollars reported in each aging bucket over the past year as a proportion of all dollars reported on the age trial balance. Note that the total dollars reported in the age trial balance in most cases does not equal the total purchases because bills that are not paid at the end of the month are included in the next month's aging and double counted.

In order to avoid this double counting, bills which are not paid the following month are subtracted out of the sum for each age bucket. In the example above each of the $10,000 entries in the current row are subtracted out, because these bills were not paid the next month and became 1-30 days late. The smaller total, representing only the final aging stop for each invoice is shown in the pay $ row of the example. The sum of dollars in the pay $ row must equal the total purchases.

In addition, cash. purchases are not included in the age trial balance at all. In our example, purchases of $30,000 are made of which $20,000 (67%) are paid 1-30 days late, and $10,000 (33%) are paid 31-60 days late.

After the proportion of dollars paid in each bucket is calculated, trade labels the buckets and applies a best-worst rule that has been approved by the credit manager of the reporting trade tape supplier. First, the credit manager selects a label for each aging bucket. All of the examples in this brochure use the strictest approach of labeling "current" as prompt, "1-30" as slow30, "31-60" as slow60, etc. Often credit managers give a grace period where the "1-30" bucket is also called prompt, "31-60" is called slow30, and so on.

The best-worst rule is two numbers that tell trade how to translate the bucket percentages into a paying record. The most common best-worst rule among D&B's trade tape providers is 30-10. This means that trade will look at the agings and find the category that has the best 30% of all dollars and the category that includes the worst 10%. These two categories become the paying record. Using the 30-10 rule on our example, our company would be classified as slow30-slow60 because over 30% of its purchases are paid slow30 (67%) and over 10% are slow60 (33%). In selecting the best-worst rule percentages the credit manager can also influence the way a customer's payment experience is reported.

Using the 30-10 rule this trade experience would be reported as follows:

| Company Name | Selling Terms | Now Owes | Past Due | Paying Record | High Credit | Last Sale Within |
|---|---|---|---|---|---|---|
| Rock Castle | Net 30 | 0 | 0 | Slow30-Slow60 | 10,000 | 6 mos. |

Assumption:

Days late is being calculated within the financial accounting program client.

Days late calculated by . . .

Transfer of Trade Data from Financial Accounting Program Desktop to D&B SBO Server (Operation or Step 204 of FIG. 7)

XML APIs

When the financial accounting program users click the Send Data button an asynchronous XML message request is made to upload the payment data to the DNB small business operation (SBO) server.

Transfer of Trade Data from D&B SBO Server to Trade Processor (Operation or Step 206 in FIG. 7)

When request is received on D&B/SBO, additional user elements will be obtained before submission to trade processor 32 for processing by the credit company. This is because in order to process the trade data, a corporate identifier is required for both the company making the trade reference and the companies that are the trade references. Therefore, it might be necessary to do a name match on both the financial accounting program user and the user's customers.

D&B Trade Processing (Operation or Step 208 in FIG. 7)

The data transmitted from the small business server (SBS) will update a SQL database on an appropriate local server.

The workflow to process the trade date really depending upon the final data elements supplied. If one has the corporate identifier or DUNS number both the financial accounting program user and the financial accounting program user's accounts each time, the workflow will be dramatically different and more complicated than receiving both DUNS numbers with the trade transaction data.

Technology will develop a database and workflow that would prevent continuous re-lookup of the records already matched (financial accounting program user and financial accounting program user's accounts). Potentially, one builds a participant index file (PIF) which uses a name and address key to determine if prior match should remain intact or be re-looked-up.

The invention having been thus described with particular reference to the preferred forms thereof, it will be obvious that various changes and modifications may be made therein without departing from the spirit and scope of the invention as defined in the appended claims.

What is claimed is:

1. A system for producing electronic business information reports comprising:

a communication network;

a group of modules including a website module, a report fabrication module, and a local database module;

a user interface through which a user (i) communicates with the group of modules, via the communication network, and (ii) controls the group of modules, via the communication network, wherein the report fabrication module receives a request for an electronic business information report through the user interface via the communication network and interacts with the group of modules to:

(a) combine multiple data inputs in extensible markup language (XML) format from a variety of data sources to yield a first composite data stream in XML format;

(b) transform the first composite data stream to a second composite data stream in hypertext markup language (HTML) format;

(c) produce the electronic business report from the second composite data stream; and (d) output the electronic business information report to the user interface in HTML format, wherein the electronic business information report includes trade data of an entity, wherein said trade data includes selected data for evaluating an entity's business performance, and wherein the trade data comprises data from the local database module and data from an outside data source external to the group of modules.

2. A system as defined in claim 1, wherein the local database module comprises a database of corporate identifier number records.

3. A system as defined in claim 2, in which the website module is coupled to the local database module to select a candidate from a list for which said electronic business information report will be requested.

4. A system as defined in claim 1, wherein the report fabrication module is coupled to a module of content rules for fabricating the electronic business report.

5. A system as defined in claim 1,
   wherein the group of modules further comprise a back office module, a side files module, and crosswalks to the outside data source, and
   wherein the outside data source comprises at least one of a free content source and a pay content source.

6. A system as defined in claim 5, in which the crosswalks couple data from the local database module with outside data comprising at least one of ratings data, business news and new economy data.

7. A system as defined in claim 5, in which a corporate identifier is coupled to web information files and full public filings information.

8. The system of claim 1 wherein the electronic business information reports comprise trade data.

9. The system of claim 8 further comprising a database module of corporate identifier number records; a trade processor; and a server for operating in conjunction with the trade processor, wherein the trade processor and the server collect and store trade information in the database for use in electronic business information reports.

* * * * *